May 28, 1957  J. M. DIETRICH  2,793,486
HARVESTER FOR STALK TYPE CROPS
Filed Dec. 27, 1955  5 Sheets-Sheet 4
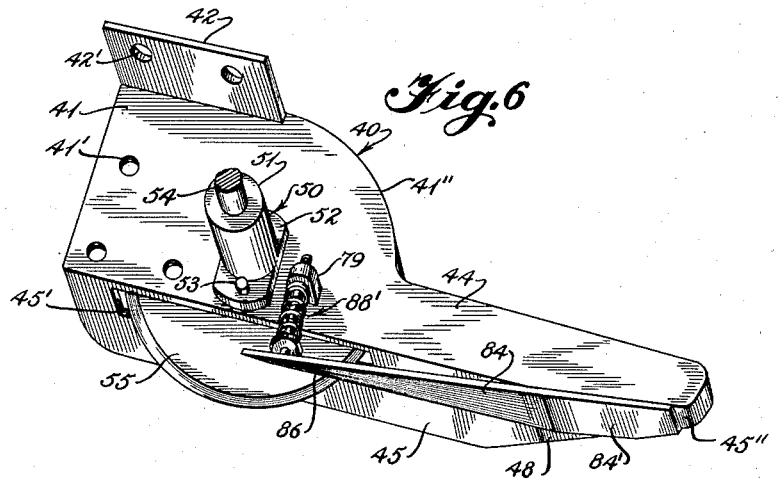
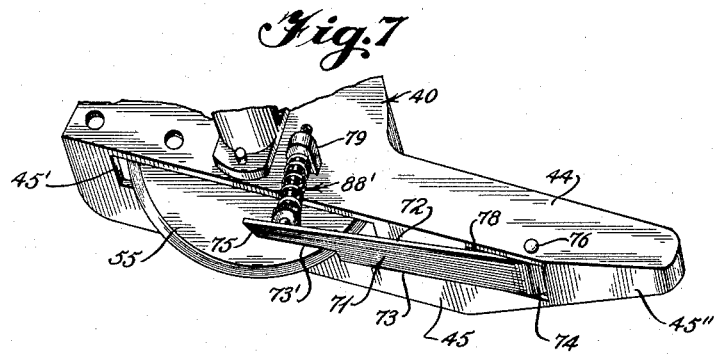
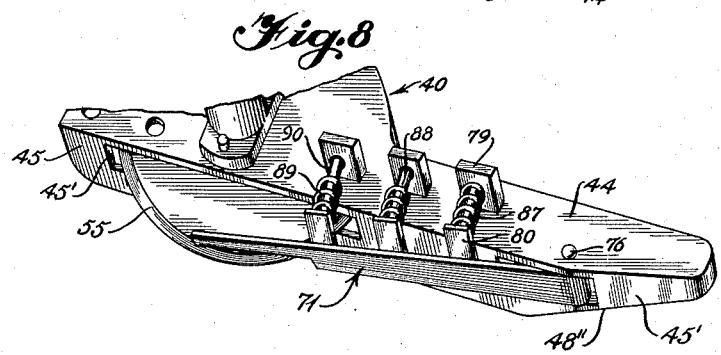
INVENTOR
James M. Dietrich
BY Beale & Jones
ATTORNEYS

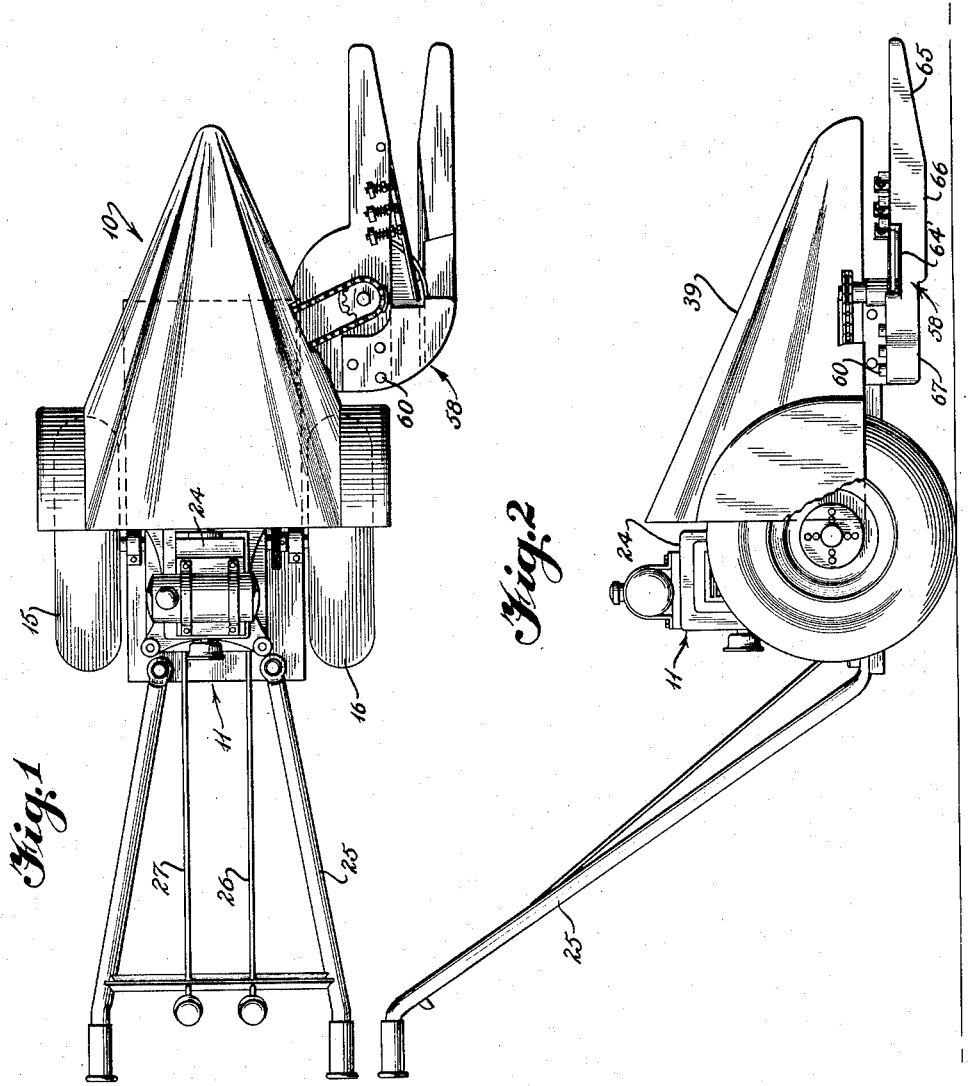

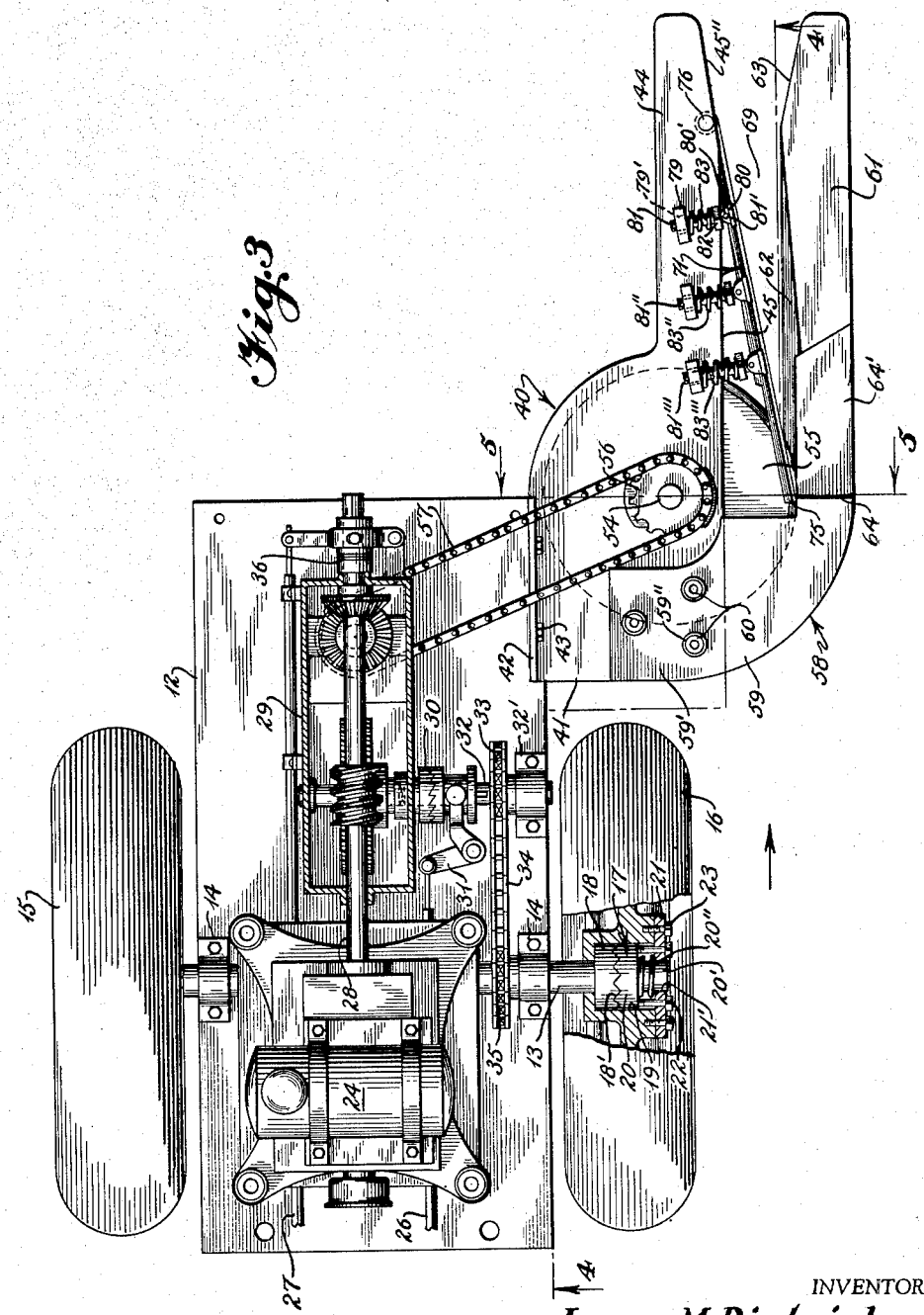

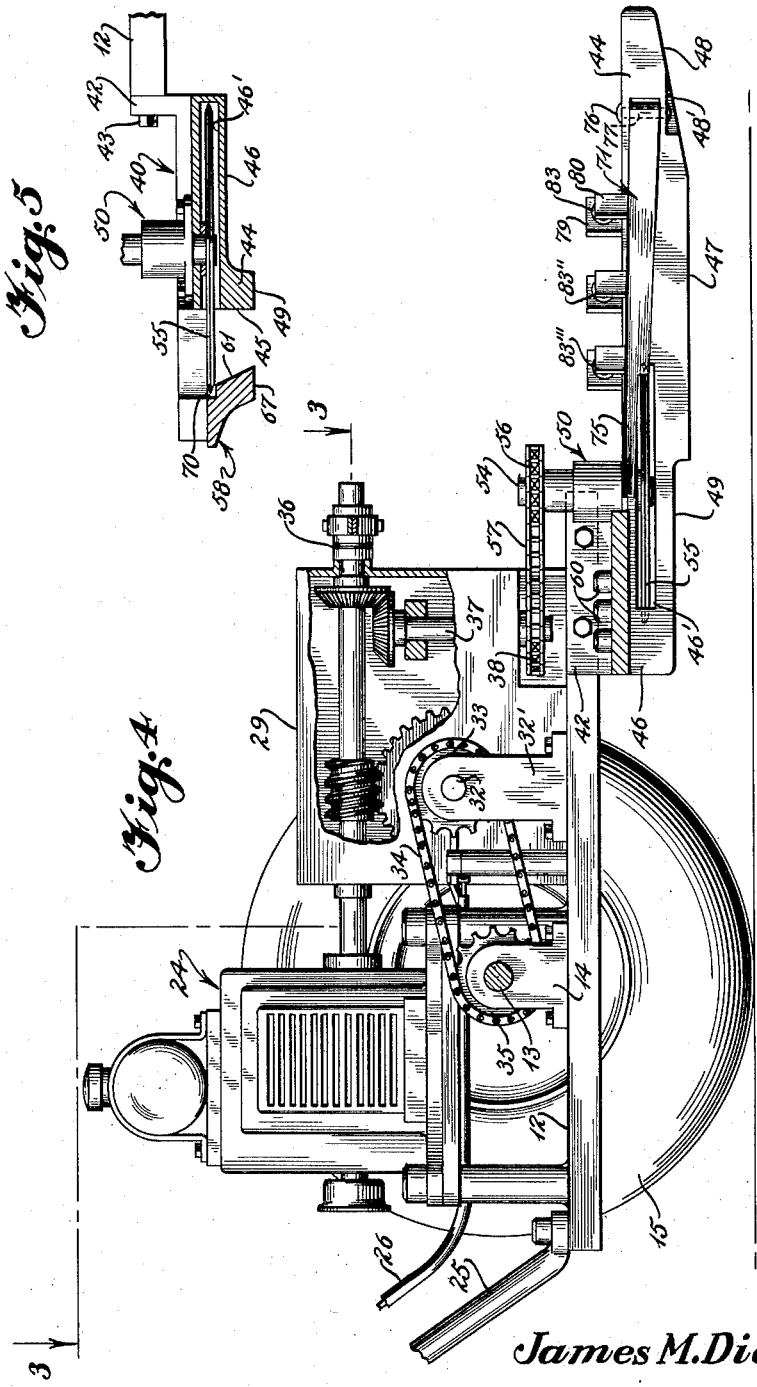

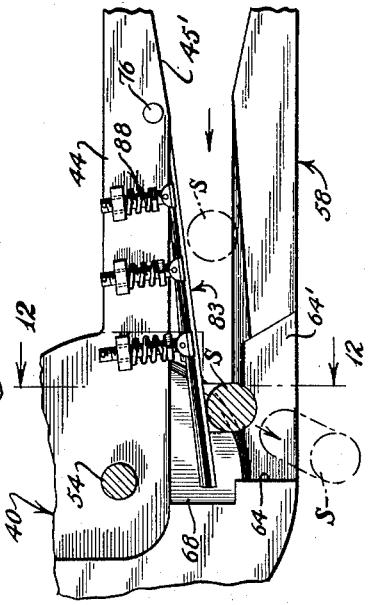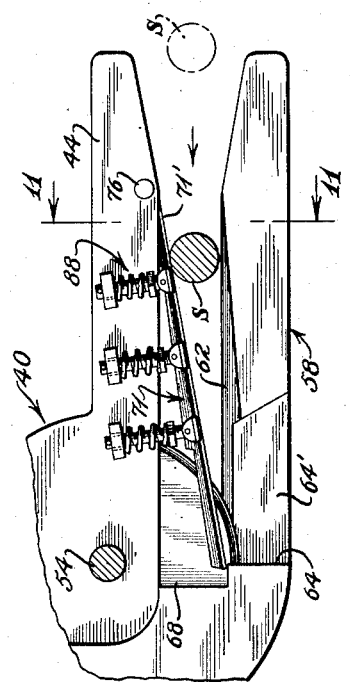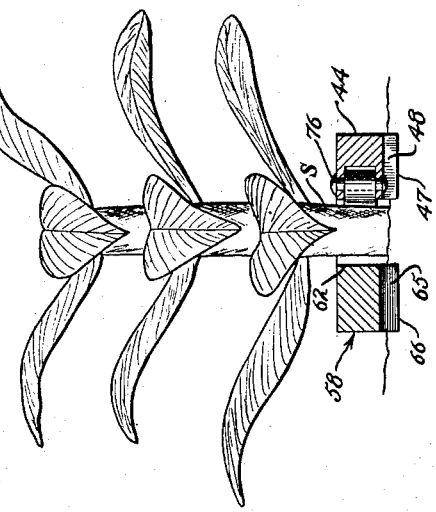

United States Patent Office 2,793,486
Patented May 28, 1957

2,793,486

HARVESTER FOR STALK TYPE CROPS

James M. Dietrich, Lititz, Pa.

Application December 27, 1955, Serial No. 555,512

13 Claims. (Cl. 56—27.5)

This invention relates to improvements in a harvester for row crops and more particularly to machines for harvesting tobacco.

It has been difficult to harvest certain row crops growing on stalks and particularly tobacco wherein damage is done to the leaves. The necessity for harvesting crops of this type by hand was eliminated by the harvester disclosed in my Patent No. 2,597,076 granted May 20, 1952. Improvements in a harvester for stalk crops is disclosed in my co-pending application Serial No. 378,836, filed September 8, 1953, and now abandoned, and of which the present application is a continuation-in-part. The present invention is an improvement on the harvester disclosed in the patent and the co-pending application.

My present application is directed to an improvement in the ejecting mechanism for truck stalks and particularly in combination with a rotary type cutter.

It is an object of my invention to provide in a power driven harvester a pair of spaced apart forwardly extending guide members between which a stalk to be cut is received with ejector means pivoted at its forward end to one of the guide members and biased to eject the stalk as it moves thereagainst and upon its completion of being severed by a cutter member.

A still further object of my invention is to provide in a harvester of this type an ejector plate which is pivoted at its forward end and extends in an elongated manner across a guide throat and which is increasingly biased as the uncut stalk moves thereagainst from forward end to rear end as the harvester advances until a maximum biasing on the ejector is obtained at the instant the stalk is severed by a rotary cutter associated therewith.

A still further object of my invention is to provide a mounting for an elongated ejector plate pivoted at its forward end to one of a pair of guide members wherein the rear end of the ejector plate is supported for sliding movement adjacent a rotary cutter and at the rear end of a throat formed between the pair of guide members.

A still further object of the invention is to provide in a harvester a pair of guide members which extend forwardly and form a throat therebetween and have a rotary cutter mounted at the rear of the throat with an ejector plate of the leaf spring type attached at its forward end in a rigid manner to one of the guide members and extending rearwardly and diagonally across the throat and having a biasing means disposed between the rear end and the guide members to which it is attached such that as a stalk moves thereagainst it pivots the ejector plate and biases to a maximum amount as the stalk is severed by the cutter so that the ejector plate will thrust the cut stalk to the side of the harvester.

A further object of my invention is to provide in a harvester for stalk crops a pair of guide members between which the stalk is received with one of the guide members having an inclined face against which the stalk is tilted and means for ejecting the stalk and cutting the stalk with the ejecting means including means to also tilt the stalk.

Still further objects and the entire scope of applicability of the present invention will become apparent from the detailed description given hereinafter. It should be understood, however, that the detailed description and its specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference may be had to the drawings and to the written description that follows and in which drawings:

Fig. 1 is a plan view of the harvester;

Fig. 2 is a side elevational view of the harvester;

Fig. 3 is a plan view on an enlarged scale of the harvester shown in Fig. 1 without the handles on the tractor and with certain parts broken away and shown in section.

Fig. 4 is a vertical sectional view along line 4—4 of Fig. 3 with certain parts broken away to better illustrate hidden elements;

Fig 5 is a section view along section line 5—5 of Fig. 3 showing a portion of the harvester per se;

Fig. 6 is a perspective view of a horizontal platform with forwardly extending guide members, associated rotary cutter and ejector plates.

Fig. 7 is a view similar to Fig. 6 with a portion broken away showing a different mounting for the ejector plate;

Fig. 8 is a view similar to Fig. 7 showing a still further modification in the biasing of the ejector plate;

Fig. 9 is a top plan view of a platform and two guide members with associated parts showing two successive positions of the stalk entering the throat between the guide members;

Fig. 10 is a view similar to Fig. 9 with the harvester advanced past the stalk to the point of cutting with the broken line illustration of the ejected stalk;

Fig. 11 is a vertical view along line 11—11 of Fig. 9 showing a stalk associated therewith; and Fig. 12 is a view along section line 12—12 of Fig. 10 showing the stalk being severed and projected transversely by the ejector type.

Throughout the description, like reference numerals refer to similar parts.

The harvester as generally indicated a 10 in Figs. 1 and 2 and in the illustration here given is associated with a two-wheel tractor 11 provided with a horizontally extending bed plate 12 which supports various elements and is in turn supported by an axle 13 extending through a pair of bearings 14 at each side of said plate with the axle 13 receiving ground engaging traction wheels 15 and 16. A spring pressed clutch is generally indicated at 17 and includes a ratchet member 18 rigidly affixed to the outboard end of axle 13 and received within a cylindrical recess 19 in the hub of wheel 16. Cooperating with the element 18 is a ratchet member 20 also of cylindrical shape and housed within the cylindrical cavity 19 and having a smaller stub shaft 20' projecting therefrom and received within an apertured plate 21 which is secured to driven member 20 by screw members 22 passing freely through suitable apertures in plate 21. A spring 20" is mounted on stub shaft 20' intermediate member 20 and plate 21 so as to force ratchet clutch element 20 against the other ratchet element 18. Plate 21 is secured to the hub of wheel 16 by the cap screws 23. Clutch member 20 carried by stub shaft and connected to plate 21 by screws 22 turns with plate 21 and thus wheel 16. Clutch member 18 is driven by shaft 13 and it rotates in recess 19. The ratchet teeth engagement of clutch members 18 and 20 serves to drive wheel 16 and provides relative movement between shaft 13 and wheel 16. Thus, when shaft 13 is driven as will hereinafter be described, power is applied to the traction wheel 16 as well as wheel 15 and in turning the tractor 11 relative movement between the drive shaft 13 and its ratchet hub 18 is had with respect to wheel 16 through the ratchet clutch.

Mounted on the bed plate 12 of the harvester is a typical internal combustion engine 24 and carried by the bed plate 12 are a pair of rearwardly extending handles 25 having supported and positioned therebetween a clutch control 26 for the traction drive and further clutch control 27 for the power takeoff. From the motor 24 there extends forwardly a power shaft 28 into a gear box generally indicated at 29. From the gear box 29 there extends a traction power shaft 32 which is connected thereto through a clutch 30 in turn operated by a bell crank 31 and clutch control lever 26. Shaft 32 is supported by a bearing 32' on bed plate 12 and has a drive sprocket 33 connected thereto. Chain 34 connects drive sprocket 33 with the sprocket 35 fixed to axle 13.

Also connected to the gear box 29 through a clutch 36 is a power takeoff shaft 37, see Fig. 4, having a drive sprocket 38 at the bottom end thereof below gear box 29. The forward end of the harvester, including the gear box 29, is provided with a pointed like cover 39.

Reference to Fig. 3 shows a combined cutter and an ejector generally indicated at 40 which is attached to the bed plate 12 of the tractor as will hereinafter be described. The combined cutter and ejector has a platform 41 that extends horizontally with an upturned flange 42 which is apertured at 42', see Fig. 6, to receive securing bolts 43 which secure it to the bed plate 12. Platform 41 has an appreciable thickness and is provided with threaded apertures 41', see Fig. 6, and has a curved forward edge 41" from which extends forwardly the first guide member 44. Guide member 44 is an elongated solid member having a vertical inside face 45 which extends also back in alignment with platform 41 which has an elongated slot 45' therein through which the rotary cutter 55 extends. The forward portion of the vertical face 45 extends at 45" in an outwardly flared manner as best shown in Figs. 3 and 10.

Reference to Fig. 5 shows that the platform 41 has a solid underneath portion 46 which has an arcuate slot 46' formed therein to receive the horizontally disposed cutter blade 55. The first guide 44 has a horizontally extending ground engaging flat surface 47 which inclines upwardly at its forward portion at 48 as shown in Fig. 4 and in that concept is provided with a relieved portion 48' to receive a pivot post 76 to be described. The rear portion is cut away at 49 and permits the guide 44 to slide over the ground and should it slide over any stones, the relieved portion 49 at the rear will tend to prevent the guide from being pivoted upward as it passes over the stones or obstructions. The purpose of this guide construction at its underneath portion is to try to maintain the guide 44 in close relation to the ground and in a horizontal attitude.

Mounted on a platform 41 over an aperture therein is a bearing 50 having an upstanding apertured boss 51 and a horizontally extending base flange 52 which is apertured to receive securing bolts 53 that secure the bearing to the platform 41 as best shown in Fig. 6. Within the bearing 50 there extends the vertical shaft 54 having mounted thereon at its bottom end the horizontally disposed rotary cutter blade or saw blade 55. Mounted on top of shaft 54 is the cutter drive sprocket 56 which is connected to the power takeoff sprocket by a drive chain or belt means generally indicated at 57. The cutter blade 55 rotates within the horizontal recess 46' in the platform and within a suitable associated horizontal pocket in the second guide member to be described. Thus, the rotary cutter 55 is well protected and protrudes from the platform 41 so as to sever any stalks which pass thereagainst as guided by the guide member 44 and the second guide member 58 to be described.

Second guide member 58 has a horizontally extending arcuate rear portion 59 provided with a horizontal top flange 59' extending transversely thereto and having apertures 59" therein positioned above the apertures 41' in platform 41 to receive cap screws 60 which secure it to the platform in a rigid manner. The second guide member 58 has a forwardly extending elongated portion 61 with an inside inclined face 62 which inclines upwardly from bottom to top in an outward manner in a direction towards the side of the harvester on which the guide member 58 is mounted. This outwardly inclined surface 62, as shown in Figs. 11 and 12, increases in incline from that shown in Fig. 11 at its forward end to the rear end portion as shown in Fig. 12. The forward end of this wall, as at 63, flares outwardly opposite to the flared portion 45" on first guide member 44 and the combined walls 45 and 45" on guide 44 and the walls 62 and 63 on guide 58 and particularly forward guide portion 61 form a throat 69 therebetween within which is received the stalks S as the harvester advances forwardly over the ground. Still referring to the second guide member 58 and its forwardly extending portion 61, it will be observed that there is formed therein a transverse slot 64 adjacent its rear portion and adjacent the cutter blade 55. Slot 64 has a bottom horizontal portion 64' which is in alignment with the cutter blade 55 and over which the cut stalk is projected as shown in Figs. 10 and 12. At this portion of the second guide member 58 there is a horizontally disposed arcuate slot 70 therein as shown in Fig. 5 which receives the rotary cutter blade 55. Reference to Fig. 2 shows the profile of the second guide member 58 as having an upwardly extending bottom front portion 65, a horizontally extending ground engaging portion 66 and a relieved rear portion 67 which portions and surfaces correspond with those of the first guide member portion 44 as indicated at 47 and 49 in Fig. 4.

Cooperating with the guide members 44 and 58, the slot 64' and the cutter 55 in the throat 69 between the guide members is an ejector plate generally indicated at 71 in Fig. 3 which may take various forms as will be described. The ejector plate 71 is an elongate member having a top 72, a bottom edge 73, see Fig. 7, a forward end 74 and a rear end portion 75 which rear portion extends over the cutter blade 55 at the cut-a-way bottom portion 73'. Reference to Fig. 4 shows a pivot post 76 extending vertically from the relieved portion 48' adjacent the face 45 spaced in from the end and adjacent the vertical face 45 and 45". This pivot pin extends through a suitable loop 77 which forms a pivotal bearing for the ejector plate 71. The forward end of ejector plate 71, as indicated at 74, extends within a cut-a-way recess 78 formed in the forward end of forward face 45 into the guide member 44 so that a stalk S received against the outwardly flared portion 45" of the throat 69 moves smoothly against the ejector plate 71. The ejector plate 71 extends as shown in Fig. 3, diagonally across the throat 69 to where its rear end 75 and its cut-a-way portion 73' extends over the cutter blade 55, see Fig. 4, and the extreme rear end 75 slides supportedly in slot 68 in a transverse manner as the ejector plate 71 is pivoted back and forth.

Ejector plate 71 is biased against pivotal movement so that when the stalk moves thereagainst it compresses biasing means and when the stalk is cut the biasing means acting on the ejector plate forces the stalk out transversely through the slot 64 to the side of the harvester. Since the type of crop harvested by this harvester means is of the tobacco type wherein the leaves are near the ground and must be protected, the whole cutter assembly is maintained close to the ground and the ejector means is provided to move the cut stalk quickly away from the harvesting machine so that the least amount of touching of the leaves will occur. Various spring mounting means are provided for the ejector plates and a modified ejector plate mounting is also provided. These will be discussed hereinafter.

Reference to Fig. 3 shows mounted on the first guide member 44 spaced apart lugs 79 which extend vertically and have an aperture 79' therein which extends transversely to the ejector plate 71. To the rear face of plate 71 is secured bifurcated lug members 80 provided with vertically extending apertures 80' within which is secured the apertured end of threaded pins 81 by means of pivot pins 81' so that the pins 81 will pivot freely. The end of pin 81 adjacent the pin attachment 81' is threaded to receive an adjusting nut 82 which compresses a compression spring 83 received over the pin 81 and which abuts against the upstanding lug 79. The aperture 79' in lug 79 is oversize as respects the pin 81 so that the pin may freely slide and pivot therein as the ejector plate 71 is pivoted when it is forced against the stalk as the harvester advances. The outer ends of pins 81 are apertured and receive securing pins. In Fig. 3 it will be observed that spring 83 and its pin 81 are relatively short as respects the successive springs and pins positioned there to the rear as indicated at 81" and 81'" for the pin and the springs respectively at 83" and 83'". This arrangement provides for increased loading on the ejector plate 71 as the stalk moves further to the rear thereof or as the ejector plate 71 advances further with respect to the stalk until the maximum loading is attained when the stalk reaches the rear portion as at 75 where it is severed by the cutter 55 and upon being severed is forcibly projected through the slot 64 as best shown in Figs. 11 and 12.

Reference to Fig. 12 shows that the ejector plate generally indicated at 71 has a vertically extending face 71' at its leading edge which is inclined from bottom to top in a parallel manner to the inclined face 62 on the second guide member 58 so that the stalk S is progressively tipped transversely to the side of the harvester and then projected to the side as shown in broken line in Fig. 12. Reference to Fig. 12 shows that the rear portion 71" of the inclined stalk abutting face has its maximum tilt towards the rear end 75.

Fig. 6 shows a modified form of ejector plate 84 which is in the form of a leaf spring that is of generally triangular shape at its rear portion and secured as by welding or otherwise at 84' to the inclined face 45' of the first guide member 44 while its rear end 86 projects rearwardly and upwardly over the cutter blade 55. Biasing means generally indicated at 88' similar to the biasing means in Fig. 3 ride against the lug 79 affixed to platform 41 and serve to load the leaf-like ejector plate 84.

In Fig. 7 the biasing means 88' as generally shown in Fig. 6, a single biasing means, is used with the ejector plate 71 which projects upwardly and to the rear so that the ejector means 73 is directly connected in pivotal manner to the ejector plate 71 as shown.

In Fig. 8 the type of ejector plate mounting 71 as described heretofore for Figs. 1–3 inclusive, is shown except that the compression spring members decrease in length from forward end to rear end as shown by the forward long spring 87, a medium size in length spring 88 and a short spring 89, all of which are positioned on equal length pins 90 having the same spacing between fixed lug 79 on first guide member 44 and upstanding lug 80 on the pivot plate 71. Also shown in Fig. 8 is a solid upwardly extending bottom end 48" for the guide member 44.

It is important that the ejector plate be freely movable so that it may be readily moved against the compression springs or biasing means disposed between it and the platform and first guide member. Thus, the standing stalk against which the harvester advances compresses the spring. As the ejector plate advances along the stalk, the stalk is tilted over so that it is in a proper position for severing by the cutter blade 55 as it reaches the rear end of the throat 69 adajacent the transverse slot 64. The concept here disclosed is the increased application of a biasing force to the ejector plate as the stalk advances from front to rear of the ejector plate. In Fig. 6 this is accomplished by the combination of the leaf spring 84 type of ejector plate with a single biasing means 88' positioned at the extreme rear end.

In Fig. 7 the ejector plate 71 is pivoted by pin 76 at its leading end 74 and a single biasing means 88' is used at its rear end.

In Figs. 9 and 11 there is illustrated the progressive action of the harvester in approaching a standing stalk S and how the guide members pass by the stalk to bring the ejector plate 71 into contact therewith.

In Figs. 10 and 12 the harvester has advanced farther forward with respect to the stalk and the stalk is shown as having been severed and about to be projected transversely.

I have provided a harvester that is particularly suitable for harvesting tobacco wherein a relatively long throat 69 is provided between two guide members 44 and 58 and associated with the guide members is a progressively increasable biasing of an ejector plate which tilts the stalk to one side and guides and tilts the stalk with the accompanying guide member 58 so that the stalk reaches the cutter and is severed and forcibly ejected to one side clear of the harvester.

I claim as my invention:

1. In a harvester, a platform member positioned forward of and carried horizontally in closely spaced relation to the ground, said platform member having a pair of guide members projecting forwardly thereof and forming a throat therebetween within which is receivable stalks of standing crops to be cut and projected transverse to one side of the direction of movement of said harvester, a rotary horizontally disposed cutting member mounted on said platform and projecting into the rear of said throat, means mounted on said platform for rotating said cutting member, an elongated ejector plate for the stalks being cut and having forward and rear ends and a top and a bottom edge, the forward end being attached to one of said guide members at a position in spaced relation to the leading end thereof and adjacent the throat edge thereof for pivotal movement thereto, said plate extending at an angle from forward end to rear end diagonally across said throat, said plate having a face extending away from said guide member to which said ejector plate is attached and toward said throat and extending vertically at its forward end and gradually inclined from bottom edge to top edge and toward said throat with increase of incline from the forward to rear end thereof, the rear end of said ejector plate having a portion thereof extending over said rotary cutter and biasing means positioned between said platform and guide member to which said ejector plate is attached and the ejector plate whereby upon moving said harvester in a forward direction toward spaced in line stalks to be harvested, each stalk is successively received in said throat between said guides, the ejector plate abuts against a bottom portion of the stalk and the biasing means is compressed by pivotal movement of the ejector plate as it is forced against the standing stalk as the harvester moves forward, said stalk is tilted by the inclined abutting face of said ejector plate in a direction transverse to said ejector ptale, said cutter severs said stalk and the ejector plate and the rear portion thereof projecting over said cutter urged by said compressed biasing means projects the severed stalk transverse to the direction of movement of said harvester.

2. In a harvester, a platform member positioned forward of and carried horizontally in close spaced relation to the ground, said platform member having a guide member projecting forwardly thereof against which are guided stalks of standing crops to be cut and projected transverse to one side of the direction of movement of said harvester, a rotary horizontally disposed cutting member mounted on said platform and projecting forward of said platform and adjacent the rear of said guide member, means mounted on said platform for rotating said cutting member, an elongated ejector plate for the stalks being cut and having forward and rear ends and top and bottom edges, the forward end being attached to said guide member at a position in spaced relation to the leading end thereof and adjacent an edge thereof for pivotal movement thereto, said plate extending rearwardly at an acute angle to said adjacent edge of the guide member, said plate having a stalk engaging face thereof extending away from said guide member that is vertical at its forward end and gradually inclined from bottom edge to top edge away from said guide member with increase in incline from forward end to rear end thereof, the rear end of said ejector plate having a portion thereof extending over said rotary cutter and biasing means positioned between said platform and guide member and the ejector plate whereby upon moving said harvester in a forward direction toward spaced apart in line stalks to be harvested, each stalk is successively received against said guide and the ejector plate, the biasing means acting against the ejector plate is compressed as the plate pivots thereagainst when forced against the standing stalk as the harvester moves forward, said stalk is tilted by the inclined stalk engaging face of said ejector plate in a direction transverse to said ejector plate, said cutter severs the stalk, and the ejector plate and the rear portion thereof projecting over said cutter urged by the compressed biasing means projects the severed stalk transverse to the direction of movement of said harvester.

3. A harvesting device as set forth in claim 2 wherein said biasing means comprises a plurality of spaced apart compression spring members.

4. A harvesting device as set forth in claim 2 wherein said biasing means comprises a plurality of spaced apart individual compression elements arranged to be compressed successively from forward to rear along said ejector plate whereby progressive increase of bias is applied to said ejector plate to load said ejector plate with its maximum projecting force as the stalk is severed.

5. A harvesting device as set forth in claim 2 wherein said ejector plate is in the form of a leaf spring having its forward end secured rigidly to said guide member.

6. A harvesting device as set forth in claim 5 wherein said biasing means comprises a single compression spring extending transversely to said ejector plate intermediate said platform and the rear end of said ejector plate.

7. A harvesting device as set forth in claim 2 wherein said ejector plate is attached at its forward end to said guide member by a pivot means.

8. A harvesting device as set forth in claim 7 wherein said biasing means comprises a single compression spring extending transversely to said ejector plate intermediate said platform and the rear end of said ejector plate.

9. In a harvester, a platform member positioned forward of and carried horizontally in close spaced relation to the ground, said platform member having a pair of guide members projecting forwardly thereof and forming a throat therebetween within which is receivable stalks of standing crops to be cut and projected transverse to one side of the direction of movement of said harvester, a rotary horizontally disposed cutting member mounted on said platform and projecting into the rear of said throat formed between said forwardly projecting guide members, means mounted on said platform for rotating said cutting member, an elongated ejector member for the stalks being cut and having forward and rear ends and a top and a bottom edge, the forward end being pivotally attached to one of said guide members at a position in spaced relation to the leading end thereof and adjacent the throat edge thereof, said ejector member extending at an angle from front end to rear end diagonally across said throat and gradually upward, the rear end of said ejector member having a portion thereof extending over said rotary cutter, said other guide member having a top horizontal portion extending in alignment with the top surface of the rotary whereby the butt end of the severed stalk will pass over said top horizontal portion of said last mentioned guide member when projected by said ejector member, and a plurality of compression spring members spaced apart and positioned between said ejector member and said guide member having the ejector member attached.

10. A harvesting device according to claim 9 wherein said ejector member is in the form of a leaf spring having its forward end fixed to said guide member in adjacent spaced relation to the forward end thereof at the throat edge of said guide member.

11. A harvesting device according to claim 9 including spaced apart lugs attached to the back face of said ejector member opposite the stalk abutting face, spring receiving pins pivoted at one end to said lugs and extending transverse to said ejector member, said pins having stops thereon adjacent their pivot ends against which one end of said compression springs abut when mounted on said pins and fixed apertured lug elements attached to the adjacent guide, said fixed lugs freely receiving the unattached ends of said pins and said springs abutting the lugs.

12. In a harvesting machine including a tractor comprising a bed, ground engaging wheels supporting said bed and a power supply means on said bed; the improvement comprising a platform closely spaced to the ground and attached adjacent the forward end of said bed and projecting horizontally and transversely therefrom so as to project to one side of said tractor, a first and a second guide member projecting forwardly from said platform and forming a throat therebetween within which is receivable stalks of standing crops to be cut and projected transverse to the side of the tractor on which said platform projects, said first guide member being intermediate said second guide member and the tractor, a rotary horizontally disposed stalk cutting member mounted on said platform and projecting into the rear of said throat, means mounted on the platform and connected with said power supply for rotating said cutting member, an elongated ejector plate for the stalks being cut and having forward and rear ends and a top and a bottom edge, the forward end being pivotally attached to the first guide member at a position in spaced relation to the leading end thereof and adjacent the throat edge thereof, said plate extending at an angle from forward end to rear end diagonally across said throat, said plate having a stalk engaging face lying away from said guide member to which said ejector plate is pivoted and toward said throat opening formed between said guide members and extending vertically at its forward end and said stalk engaging face gradually inclining from bottom edge to top edge and toward said throat with increase of incline from the forward to rear end thereof, the rear end of said ejector plate having a portion thereof extending over said rotary cutting member, said second guide member having a transverse slot extending across its upper portion adjacent said cutting member and at a position adjacent the rear end portion of said ejector plate, the bottom of said slot being in horizontal alignment with the cutting member, said slot slidably receiving the stalk when severed by the cutting member and projected by the ejector plate and a plurality of compression spring means disposed between the ejector plate and said first guide member which are compressed when the tractor moves forward and receives a stalk to be cut in said throat and against said ejector plate which is pivoted to compress said springs whereupon when the cutting member severs the stalk, the stalk is projected through said slot by said ejector plate.

13. In a harvester, a combined platform and first forwardly projecting guide member comprising a horizontally extending platform having a horizontally extending arcuate recess to receive a rotary cutter and a forwardly projecting integral guide member on said platform having a horizontal bottom for ground engagement, said bottom sloping gradually upwardly and forwardly, said integral guide member on the platform also having a cut away horizontally extending rear portion and vertically extending inside face with an outwardly flared front portion; bearing means attached to said platform; a horizontally extending rotary cutter mounted in said recess and having a portion thereof projecting beyond said platform and the face of said guide member, and having a vertically disposed cutter mounting shaft extending in said bearing means; means on said harvester and connected with said shaft for rotating said cutter; a second guide member positioned in spaced relation adjacent said first guide member to form a stalk receiving throat therebetween and having a rear portion with a horizontally extending top flange overlying a portion of the rear of said platform and secured thereto, said rotary cutter extending into the rear of said throat formed between said first and second guide members; said second guide member having an inclined face extending upwardly and away from said first guide member, said second guide member having a stalk engaging portion adjacent said face at its front and the rear thereof which slopes gradually outwardly from the bottom to the top with said slope gradually increasing toward the rear thereof, said second guide member having a transverse slot in its upper rear portion and having the bottom of the slot in alignment with said rotary cutter, said second guide member having a ground engaging horizontal portion, an upwardly sloping front end and a cut-away rear portion; an elongated ejector plate for stalks to be cut by said rotary cutter that are received in the throat formed between said forwardly projecting guide members, said ejector having forward and rear ends and a top and a bottom edge, the forward end being attached to said first of said guide members at a position adjacent the rear end of the outwardly flared vertical face thereof, and extending at an angle from forward end to rear end diagonally across said throat, said plate having a stalk abutting face extending away from said first guide member and toward second guide member, said face of the ejector plate extending vertically at its forward end and gradually inclined from bottom edge to top edge and toward said inclined inner face on said second guide member with increase in incline from the forward to rear end thereof so as to be generally parallel to the inclined face on the second guide member, the rear end of said ejector plate having a portion thereof extending over said rotary cutter; and biasing means positioned between the rear of said ejector plate and on said combined platform and first guide member, said biasing means being compressed as the harvester moves forward and forces a stalk to be cut against said stalk abutting face of the ejector plate until the stalk is cut by the cutter whereupon the cut stalk is projected by the ejector plate through said slot in the second guide member and to the side of said harvester.

References Cited in the file of this patent
UNITED STATES PATENTS 2,597,076   Dietrich _____ May 20, 1952